United States Patent
Tezuka

(10) Patent No.: US 10,052,559 B2
(45) Date of Patent: Aug. 21, 2018

(54) INFORMATION STORAGE MEDIUM AND GAME SYSTEM

(71) Applicant: BANDAI NAMCO Games Inc., Shinagawa-ku, Tokyo (JP)

(72) Inventor: Koji Tezuka, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 372 days.

(21) Appl. No.: 14/659,778

(22) Filed: Mar. 17, 2015

(65) Prior Publication Data
US 2015/0336003 A1    Nov. 26, 2015

(30) Foreign Application Priority Data
May 26, 2014    (JP) .................................. 2014-108407

(51) Int. Cl.
| | |
|---|---|
| A63F 13/58 | (2014.01) |
| A63F 13/792 | (2014.01) |
| A63F 13/822 | (2014.01) |
| A63F 13/46 | (2014.01) |

(52) U.S. Cl.
CPC ............ *A63F 13/58* (2014.09); *A63F 13/792* (2014.09); *A63F 13/822* (2014.09); *A63F 13/46* (2014.09); *A63F 2300/575* (2013.01)

(58) Field of Classification Search
CPC ............................... A63F 13/825; A63F 13/58
See application file for complete search history.

(56) References Cited

U.S. PATENT DOCUMENTS

| | | | |
|---|---|---|---|
| 6,251,010 B1 * | 6/2001 | Tajiri | A63F 13/005 463/1 |
| 6,267,677 B1 * | 7/2001 | Tajiri | A63F 13/10 463/1 |

(Continued)

FOREIGN PATENT DOCUMENTS

| | | |
|---|---|---|
| JP | 2009-240659 A | 10/2009 |
| JP | 2012-061060 A | 3/2012 |

(Continued)

OTHER PUBLICATIONS

"Game Basics," Available as early as Jan 16, 2006, IGN Guides, avaialble at http://web.archive.org/web/20060116180636/http://guidesarchive.ign.com/guides/9846/basics.html, last accessed, May 19, 2017.*

(Continued)

*Primary Examiner* — Jay Liddle
(74) *Attorney, Agent, or Firm* — Posz Law Group, PLC

(57) ABSTRACT

A game system causes an enemy character that is caused to battle with a player character to appear by implementing a first lottery, and implements a battle between the enemy character that has been caused to appear and the player character. After the battle has started, when a player has performed an operation input that selects one item among a plurality of types of items for acquiring the enemy character, the game system implements a second lottery based on the win probability that corresponds to the type of the selected item and gives the enemy character with which the player character has battled to the player when the player has won the second lottery.

12 Claims, 12 Drawing Sheets

(56) References Cited

U.S. PATENT DOCUMENTS

| | | | |
|---|---|---|---|
| 7,233,988 B2* | 6/2007 | Minakuchi | H04W 8/005 709/213 |
| 2003/0008714 A1* | 1/2003 | Tajiri | A63F 13/34 463/43 |
| 2007/0076015 A1* | 4/2007 | Tanabe | A63F 13/10 345/619 |
| 2009/0280905 A1* | 11/2009 | Weisman | A63F 13/08 463/40 |
| 2012/0064969 A1 | 3/2012 | Uchibori | |
| 2014/0256430 A1* | 9/2014 | Matsumura | A63F 13/10 463/31 |
| 2014/0278844 A1* | 9/2014 | Khanna | A63F 13/795 705/14.4 |
| 2014/0357339 A1 | 12/2014 | Urushihara et al. | |
| 2015/0031461 A1* | 1/2015 | Momose | A63F 13/327 463/42 |
| 2015/0050986 A1* | 2/2015 | Fujimoto | A63F 13/833 463/23 |

FOREIGN PATENT DOCUMENTS

| | | |
|---|---|---|
| JP | 2013-202405 A | 10/2013 |
| JP | 5457585 B1 | 4/2014 |

OTHER PUBLICATIONS

"Items and Machines," Available as early as Jan 16, 2006, IGN Guides, avaialble at http://web.archive.org/web/20060116190150/ http://guidesarchive.ign.com/guides/9846/items.html, last accessed, May 19, 2017.*

"One Nap, MEDIA FACTORY's Pokemon Guide Pocket Monster Diamond Pearl Official Adventure Clearing Guide First Edition Pokemon Kabushikikaisha," by MEDIA FACTORY, Yoshihisa Yamashita dated Oct. 27, 2006, First Edition, pp. 16-17 and 38 (and partial English translation thereof).

"Dragon Quest Monsters-Joker 2, Weekly Famitsu vol. 25 Eleventh," by ENTERBRAIN, INC. dated Mar. 4, 2010, vol. 25, p. 256 (and partial English translation thereof).

* cited by examiner

FIG.6

| TYPE | WIN PROBABILITY | PRICE | PRICE (AFTER BATTLE HAS STARTED) |
|---|---|---|---|
| NORMAL | 30% | 0 POINTS | 0 POINTS |
| SILVER | 50% | 100 POINTS | 200 POINTS |
| GOLD | 70% | 300 POINTS | 500 POINTS |
| PLATINUM | 90% | 500 POINTS | 900 POINTS |

INFORMATION STORAGE MEDIUM AND GAME SYSTEM

Japanese Patent Application No. 2014-108407, filed on May 26, 2014, is hereby incorporated by reference in its entirety.

BACKGROUND OF THE INVENTION

The present invention relates to an information storage medium and a game system.

A game system has been known that implements a battle game that sets a deck and a card based on input information, and causes a player character to attack an enemy character (see JP-A-2012-61060, for example). A battle game that allows the player to acquire the enemy character by a lottery by defeating the enemy character that appears in each stage has been known.

A known battle game is designed so that whether or not to give the enemy character to the player is determined by a lottery based on a given win probability irrespective of whether or not the player desires to acquire the enemy character.

SUMMARY

Several aspects of the invention may provide an information storage medium and a game system that allow the player to easily acquire the desired character.

According to a first aspect of the invention, there is provided a computer-readable information storage medium storing a program for implementing a battle game in which a player character battles with an enemy character, the program causing a computer to function as:
  a character appearance control section that causes the enemy character that is caused to battle with the player character to appear by implementing a first lottery;
  a battle execution section that implements a battle between the enemy character that has been caused to appear and the player character; and
  a character-giving section that, after the battle has started, when a player has performed an operation input that selects one item among a plurality of types of items for acquiring the enemy character, performs a process that implements a second lottery based on a win probability that corresponds to a type of the selected item and gives the enemy character with which the player character has battled to the player when the player has won the second lottery.

According to a second aspect of the invention, there is provided a computer-readable information storage medium storing a program for implementing a battle game in which a player character battles with an enemy character, the program causing a computer to function as:
  a character appearance control section that causes the enemy character that is caused to battle with the player character to appear by implementing a lottery;
  a battle execution section that implements a battle between the enemy character that has been caused to appear and the player character; and
  a character-giving section that, after the battle has started, when a player has performed an operation input that selects one item among a plurality of types of items for acquiring the enemy character, performs a process that gives the enemy character with which the player character has battled to the player, the character-giving section changing the rarity of the enemy character that is to be given to the player corresponding to the type of the selected item.

According to a third aspect of the invention, there is provided a game system that implements a battle game in which a player character battles with an enemy character, the game system including:
  a character appearance control section that causes the enemy character that is caused to battle with the player character to appear by implementing a first lottery;
  a battle execution section that implements a battle between the enemy character that has been caused to appear and the player character; and
  a character-giving section that, after the battle has started, when a player has performed an operation input that selects one item among a plurality of types of items for acquiring the enemy character, performs a process that implements a second lottery based on a win probability that corresponds to a type of the selected item and gives the enemy character with which the player character has battled to the player when the player has won the second lottery.

BRIEF DESCRIPTION OF THE SEVERAL VIEWS OF THE DRAWING

FIG. 6 is a table illustrating an example of table information that is referred to when implementing a second lottery.

Figure 1:
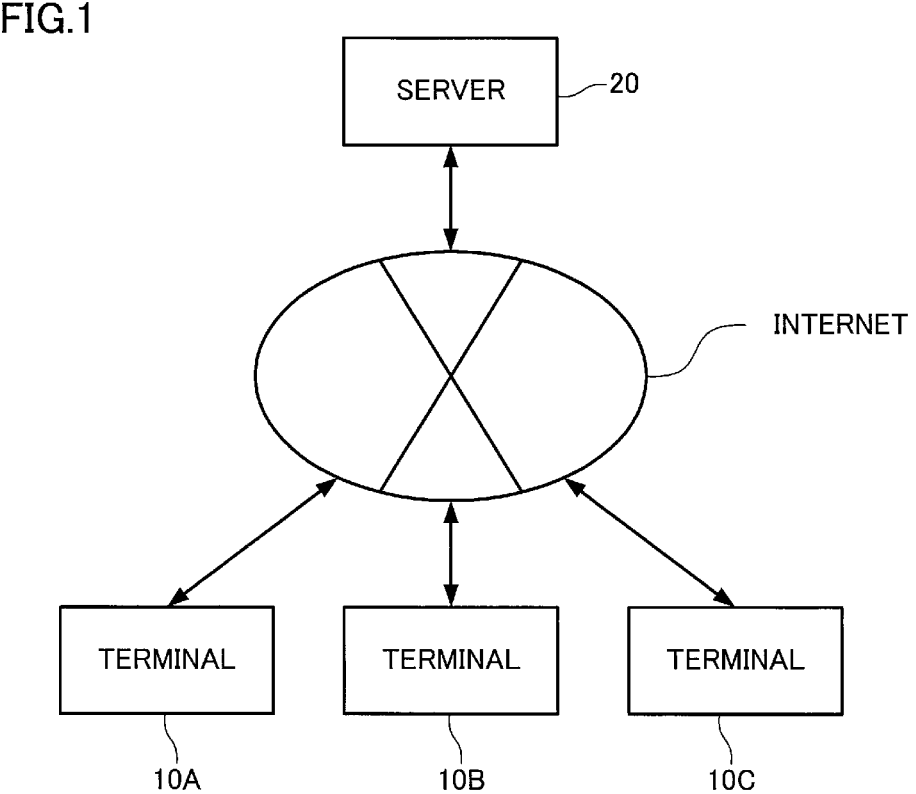
FIG. 1 is a diagram illustrating a game system according to one embodiment of the invention.

DETAILED DESCRIPTION OF THE EMBODIMENT (1) According to one embodiment of the invention, a computer-readable information storage medium stores a program for implementing a battle game in which a player character battles with an enemy character, the program causing a computer to function as:

a character appearance control section that causes the enemy character that is caused to battle with the player character to appear by implementing a first lottery;

a battle execution section that implements a battle between the enemy character that has been caused to appear and the player character; and a character-giving section that, after the battle has started, when a player has performed an operation input that selects one item among a plurality of types of items for acquiring the enemy character, performs a process that implements a second lottery based on a win probability that corresponds to a type of the selected item and gives the enemy character with which the player character has battled to the player when the player has won the second lottery.

Another embodiment of the invention relates to a game system that is configured to implement a battle game in which a player character battles with an enemy character, and includes each of the above sections.

According to the above configuration, when the player has performed an operation input that selects an item for acquiring the enemy character after the battle with the enemy character has started, a lottery based on the win probability corresponding to the type of the selected item is implemented, and the enemy character with which the player character has battled is given to the player when the player has won the lottery. Specifically, the player can obtain an opportunity to acquire the enemy character by using an item after starting a battle with the enemy character that the player desires to acquire, and increase the probability that the player will acquire the enemy character by selecting an item to which a high win probability is assigned. This makes it possible to allow the player to easily acquire the desired character.

(2) The game system may further include a notification section that, when the player possesses a character that is identical with the enemy character with which the player character has battled, performs a process that notifies the player of the possession of the character.

The information storage medium may store the program that causes the computer to further function as a notification section that, when the player possesses a character that is identical with the enemy character with which the player character has battled, performs a process that notifies the player of the possession of the character.

This makes it possible to provide the player with information for determining whether or not to use an item, and improve convenience to the player.

(3) In the information storage medium and the game system, the character-giving section may set the attribute of the selected item to the enemy character that is to be given to the player.

This makes it possible for the player to set the desired attribute to the enemy character to be acquired by the player, by selecting an item taking account of the attribute of the item.

(4) In the information storage medium and the game system, the character-giving section may change the win probability corresponding to the combination of the attribute of the selected item and the attribute of the enemy character with which the player character has battled.

This makes it possible for the player to increase the probability that the player will acquire the enemy character by selecting an item taking account of the combination of the attribute of the item and the attribute of the enemy character that the player desires to acquire. This makes it possible to allow the player to easily acquire the desired character.

(5) In the information storage medium and the game system, the character-giving section may change the win probability corresponding to the combination of the attribute of the player character and the attribute of the enemy character with which the player character has battled.

This makes it possible for the player to increase the probability that the player will acquire the enemy character by selecting the player character taking account of the combination of the attribute of the player character and the attribute of the enemy character that the player desires to acquire. This makes it possible to allow the player to easily acquire the desired character.

(6) In the information storage medium and the game system, when the player possesses a character that is identical with the enemy character that is given to the player, the character-giving section may perform a process that gives a synthetic character to the player, the synthetic character being generated by synthesizing the character that is possessed by the player and identical with the enemy character that is to be given to the player, and the enemy character that is to be given to the player.

This makes it possible to give a synthetic character generated by synthesizing the characters desired by the player to the player.

(7) In the information storage medium and the game system, the character appearance control section may increase the probability that the enemy character with which the player character has battled will appear as a result of the first lottery when the player has lost the second lottery.

According to this configuration, when the player has failed to acquire the desired enemy character, it is possible to cause the enemy character to appear at a higher probability. This makes it possible to allow the player to easily acquire the desired character.

(8) According to another embodiment of the invention, a computer-readable information storage medium stores a program for implementing a battle game in which a player character battles with an enemy character, the program causing a computer to function as:

a character appearance control section that causes the enemy character that is caused to battle with the player character to appear by implementing a lottery;

a battle execution section that implements a battle between the enemy character that has been caused to appear and the player character; and a character-giving section that, after the battle has started, when the player has performed an operation input that selects one item among a plurality of types of items for acquiring the enemy character, performs a process that gives the enemy character with which the player character has battled to the player, the character-giving section changing the rarity of the enemy character that is to be given to the player corresponding to the type of the selected item.

Another embodiment of the invention relates to a game system that is configured to implement a battle game in which a player character battles with an enemy character, and includes each of the above sections.

According to the above configuration, when the player has performed an operation input that selects an item for acquiring the enemy character after the battle with the enemy character has started, the enemy character with which the player character has battled is given to the player, and the rarity corresponding to the type of the selected item is set to the enemy character. This makes it possible for the player to acquire the enemy character by using an item after starting a battle with the enemy character that the player desires to acquire, and increase the rarity of the enemy character by selecting an item to which high rarity is assigned.

Exemplary embodiments of the invention are described below. Note that the following embodiments do not unduly limit the scope of the invention as stated in the claims. Note also that all of the elements described below in connection with the following exemplary embodiments should not necessarily be taken as essential elements of the invention.

1. Configuration

FIG. 1 illustrates a network system (game system) according to one embodiment of the invention. The network system includes a plurality of terminals 10 (game devices) and a server 20 (server system). As illustrated in FIG. 1, the network system is configured so that the server 20 that provides a service and the terminals 10 can be connected to a network.

The server 20 is an information processing device that provides a service that allows a plurality of users (players) to communicate. In one embodiment of the invention, the server 20 provides a community-type service that is referred to as "social networking service (SNS)". Specifically, the server 20 transmits user information (e.g., user name, diary, notice information, and state of game field) to a user who has logged in, and another user who maintains a friendship with the user who has logged in, so that these users can communicate. The server 20 may provide the service to only users who have registered themselves as a member. The server 20 may be implemented by a single server, or may be implemented by a plurality of servers (e.g., authentication server, game processing server, communication server, accounting server, and database server).

The server 20 provides an online game service (social game) in response to a request from the terminal 10. In one embodiment of the invention, the terminal 10 executes a game program, and the server 20 manages account information about each player, information about the results of the game executed by the terminal 10, game parameters, game elements (e.g., character and item) that can be used in the game, and in-game money that can be used in the game, and the like.

The terminal 10 is an information processing device such as a portable terminal (e.g., smartphone, mobile phone, or portable game machine), a personal computer (PC), a game device, or an image generation device, and can connect to the server 20 through a network (e.g., Internet (WAN) and LAN). Note that the terminal 10 and the server 20 may be connected through a cable communication channel or a wireless communication channel.

Figure 2:
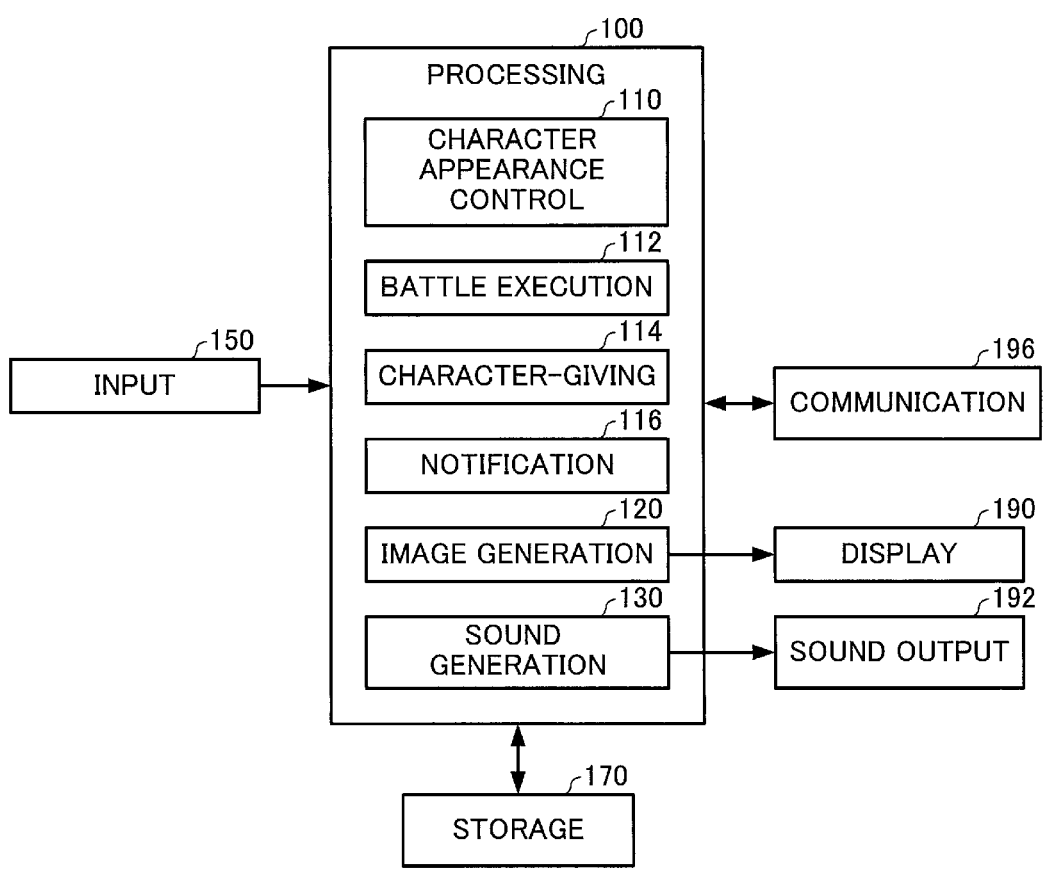
FIG. 2 illustrates an example of a functional block diagram of a terminal according to one embodiment of the invention.

FIG. 2 illustrates an example of a functional block diagram of a game device (terminal 10) according to one embodiment of the invention. Note that the game device may have a configuration in which some of the elements (sections) illustrated in FIG. 2 are omitted.

An input section 150 is a device that detects information (input information) input by the player, and outputs the information (operation input) input by the player to a processing section 100. The function of the input section 150 may be implemented by an input device such as a touch panel (touch panel display), a touch pad, a mouse, a direction key, a button, or a keyboard.

A storage section 170 stores a program that causes a computer to function as each section of the processing section 100, and various types of data, and serves as a work area for the processing section 100. The function of the storage section 170 may be implemented by a hard disk, a RAM, or the like. The storage section 170 also stores information (appearance probability, attribute, and rarity) about an enemy character, information (type, attribute, win probability, and rarity) about a character and an item that are possessed by the player (can be used by the player), and the like as game parameters.

A display section 190 outputs a game image generated by the processing section 100. The function of the display section 190 may be implemented by a display (e.g., touch panel, LCD, or CRT).

A sound output section 192 outputs sound generated by the processing section 100. The function of the sound output section 192 may be implemented by a speaker, a headphone, or the like.

A communication section 196 performs various control processes for communicating with the server 20. The function of the communication section 196 may be implemented by hardware such as a processor or a communication ASIC, a program, or the like.

Note that the game device may receive a program (that causes a computer to function as each section of the processing section 100) and data that are stored in an information storage medium or a storage section included in the server 20 through a network, and store the received program and data in the storage section 170. A case where the game device operates based on the program and data received from the server is also included within the scope of the invention.

The processing section 100 (processor) performs a game process, an image generation process, a sound generation process, and the like based on the information (operation input) input from the input section 150, a program, data received through the communication section 196, and the like. The function of the processing section 100 may be implemented by hardware such as a processor (e.g., CPU or DSP) or an ASIC (e.g., gate array), or a program.

The processing section 100 includes a character appearance control section 110, a battle execution section 112, a character-giving section 114, a notification section 116, an image generation section 120, and a sound generation section 130.

The character appearance control section 110 performs a control process that causes the enemy character that is caused to battle with the player character to appear in the game space (game field or map) by implementing a first lottery. The character appearance control section 110 implements the first lottery using the appearance probability that is set to each of a plurality of enemy characters as the win probability to determine one or more enemy characters among the plurality of enemy characters to be the enemy character that is caused to appear.

The battle execution section 112 implements a battle between the enemy character that has been caused to appear and the player character. The battle execution section 112 performs a process that causes the player character to attack the enemy character that has been caused to appear, based on an operation input performed using the input section 150 and a given algorithm to change the parameter of the enemy character, and causes the enemy character that has been caused to appear to attack the player character based on a given algorithm to change the parameter of the player character.

The character-giving section 114 performs a process that implements a second lottery based on the win probability that corresponds to the type of the selected item when the player has performed an operation input that selects one item among a plurality of types of items for acquiring the enemy character after the battle has started, and gives the enemy character with which the player character has battled to the player (i.e., allows the player to use the enemy character with which the player character has battled in the game as a character that is possessed by the player) when the player has won the second lottery. The character-giving section 114 performs a process that causes the selected item to be unusable (consumed or deleted).

The character-giving section 114 may set the attribute of the selected item to be the attribute of the enemy character that is given to the player.

The character-giving section 114 may change the win probability corresponding to the combination of the attribute of the selected item and the attribute of the enemy character with which the player character has battled. The character-giving section 114 may change the win probability corresponding to the combination of the attribute of the player character and the attribute of the enemy character with which the player character has battled.

The character-giving section 114 may perform a process that gives a synthetic character to the player when the player possesses a character that is identical with the enemy character that is given to the player, the synthetic character being generated by synthesizing the character that is possessed by the player and identical with the enemy character that is given to the player, and the enemy character that is given to the player.

The character appearance control section 110 may perform a control process that increases the probability (appearance probability) that the enemy character with which the player character has battled will appear as a result of the first lottery when the player has lost the second lottery that may allow the player to acquire the enemy character with which the player character has battled.

The character-giving section 114 may perform a process that gives the enemy character with which the player character has battled to the player when the player has performed an operation input that selects one item among a plurality of types of items for acquiring the enemy character after the battle has started, and changes the rarity (i.e., a parameter that represents the degree of rarity value) of the enemy character that is given to the player corresponding to the type of the selected item.

The notification section 116 performs a process that notifies the player that the player possesses a character that is identical with the enemy character with which the player character has battled (i.e., a process that displays an image that represents information to that effect on the display section 190, or a process that outputs a sound that represents information to that effect from the sound output section 192), when the player possesses a character that is identical with the enemy character with which the player character has battled.

The image generation section 120 performs a drawing process based on the results of various processes performed by the processing section 100 to generate a game image (i.e., a game image that includes a player character, an enemy character, an item, and the like), and outputs the generated game image to the display section 190. The image generation section 120 may generate an image (i.e., three-dimensional image) viewed from a virtual camera (given viewpoint) within an object space (game space).

The sound generation section 130 performs a sound generation process based on the results of various processes performed by the processing section 100 to generate a game sound such as a background music (BGM), effect sound, or voice, and outputs the generated game sound to the sound output section 192.

The processing section 100 transmits information that notifies the server 20 that the game has started to the server 20 when the game has started, and transmits game result information about the game results and various game parameters to the server 20 when the game has ended. The server 20 updates various types of data that are linked to each player based on the game result information transmitted from the game device (terminal 10).

The game system according to one embodiment of the invention may be implemented by a server system (server). The server system may be implemented by a single server, or may be implemented by a plurality of servers (e.g., authentication server, game processing server, communication server, accounting server, and database server). In this case, the server system performs the process (character appearance control process, battle execution process, character-giving process, and notification process) performed by each section of the processing section 100 based on the operation input (data input to an input section of an information processing terminal) transmitted from a single information processing terminal or a plurality of information processing terminals (e.g., smartphone, mobile phone, or portable game machine) connected to the server system through a network to generate image generation data for generating an image, and transmits the generated image generation data to each information processing terminal. Note that the term "image generation data" used herein refers to data for displaying an image generated by the techniques according to one embodiment of the invention on each information processing terminal. The image generation data may be image data, or may be data (e.g., object data and game processing result data) that is used when each information processing terminal generates an image.

2. Techniques

The techniques according to one embodiment of the invention is described below with reference to the drawings.

The game system according to one embodiment of the invention is configured to implement a battle game in which the player character battles with the enemy character.

FIGS. 3, 5, and 7 to 11 illustrate an example of a game screen (game image) that is generated by the game system according to one embodiment of the invention. A game screen GI is displayed on the display section 190 (touch panel) of the terminal 10. The player can perform an operation input by touching the touch panel with a fingertip, a touch pen, or the like (touch operation).

Figure 3:
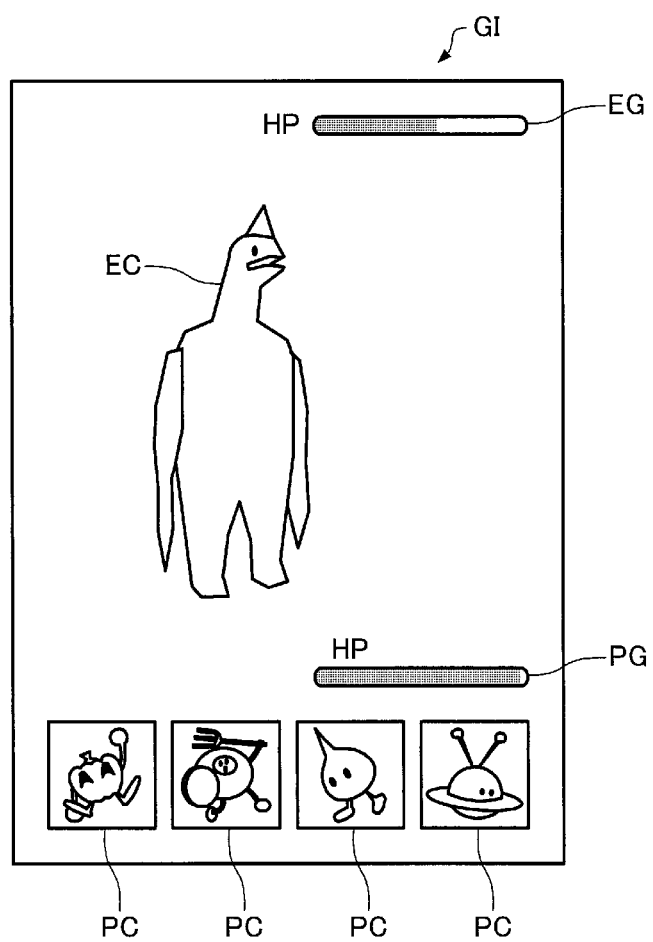
FIG. 3 illustrates an example of a game screen generated by a game system according to one embodiment of the invention.

FIG. 3 illustrates the game screen GI that is displayed when the player character battles with the enemy character.

As illustrated in FIG. 3, a player character PC and an enemy character EC are displayed within the game screen GI. In the example illustrated in FIG. 3, four player characters PC that form a party (deck) are displayed within the game screen GI. The four player characters PC are characters that have been selected by the player from the characters possessed by the player, and set to be the player character. The player can arbitrarily select characters that form a party (deck) from the characters possessed by the player when battling with the enemy character EC.

A gauge PG that represents the total hit points (strength value) of each player character PC, and a gauge EG that represents the hit points of the enemy character EC, are displayed within the game screen GI.

When the player has performed an operation input that selects one of the four player characters PC, the selected player character PC attacks the enemy character EC, and the hit points of the enemy character EC represented by the gauge EG are updated. The hit points of the enemy character EC decrease corresponding to the attack capability of the player character PC that has attacked the enemy character EC.

The enemy character EC attacks the player character PC at a given timing (e.g., each time a predetermined number of turns have elapsed), and the hit points of the player character PC represented by the gauge PG are updated. The hit points of the player character PC decrease corresponding to the attack capability of the enemy character EC.

The battle between the player character PC and the enemy character EC continues until the hit points of the player character PC or the hit points of the enemy character EC reach a predetermined value (e.g., 0) or less. It is determined that the player has won the battle when the hit points of the enemy character EC have become equal to or less than the predetermined value, and it is determined that the player has lost the battle when the hit points of the player character PC have become equal to or less than the predetermined value.

The game according to one embodiment of the invention is designed so that the player can select one mission from a plurality of missions, and select one stage from a plurality of stages included in the selected mission to battle with the enemy character that appears in the selected stage. When the player has defeated the enemy character that appears in the first stage of the mission, the player can select the next stage (second stage) of the mission. When the player has defeated the enemy character that appears in the final stage of the mission, it is determined that the player has cleared the mission.

Figure 4:
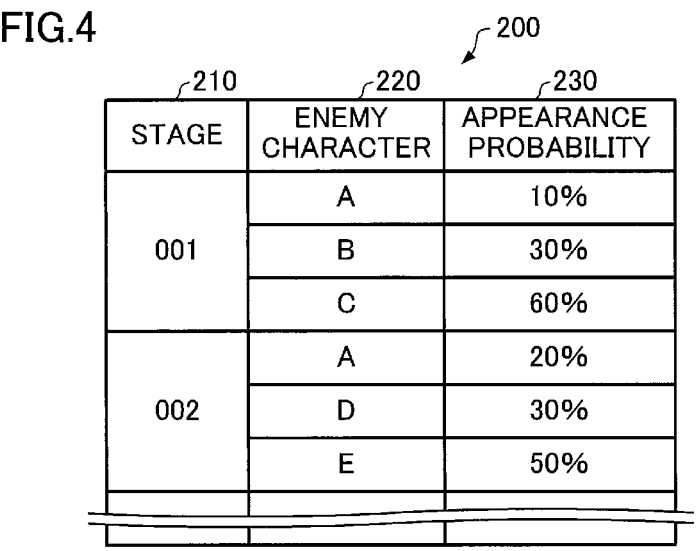
FIG. 4 is a table illustrating an example of table information for determining an enemy character that is caused to appear in each stage.

A plurality of enemy characters that can appear in the game are set corresponding to each stage, and the appearance probability is set to each enemy character. FIG. 4 is a table illustrating an example of table information for determining the enemy character that is caused to appear in each stage. Table information 200 illustrated in FIG. 4 includes information 220 that specifies a plurality of enemy characters that correspond to each stage 210, and an appearance probability 230 that corresponds to each enemy character 220. The character appearance control section 110 refers to the table information 200, and implements a lottery (first lottery) using the appearance probability 230 of each enemy character corresponding to the current stage as the win probability to determine one enemy character among the plurality of enemy characters 220 that correspond to the current stage to be the enemy character that is caused to appear in the current stage. In the example illustrated in FIG. 4, the stage "001" is set so that the enemy character "A" appears at a probability of 10%, the enemy character "B" appears at a probability of 30%, and the enemy character "C" appears at a probability of 60%. The appearance probability 230 is set to each enemy character so that the appearance probability decreases as the rarity set to the enemy character increases.

Figure 5:
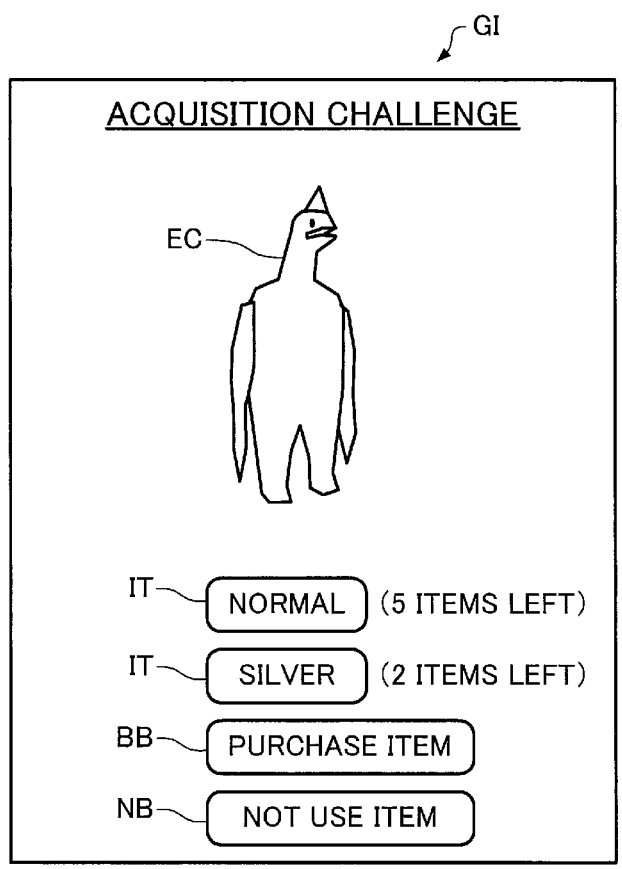
FIG. 5 illustrates an example of a game screen generated by a game system according to one embodiment of the invention.

The game according to one embodiment of the invention is designed so that the game screen GI illustrated in FIG. 5 is displayed when it has been determined that the player has won the battle with the enemy character (when the hit points of the enemy character have become equal to or less than the predetermined value), and an opportunity to acquire the enemy character defeated by the player is given to the player when the player has performed an operation input that uses (consumes) a predetermined item within the game screen GI.

The enemy character EC that has been defeated by the player, and a list (i.e., the type of each item and the number of each type of items) of items IT possessed by the player, are displayed within the game screen GI illustrated in FIG. 5. In the example illustrated in FIG. 5, the player possesses five items "NORMAL" and two items "SILVER" as the items IT for acquiring the enemy character.

When the player has performed an operation input that selects an item IT from a plurality of items IT (when the player possesses a plurality of types of items IT) within the game screen GI illustrated in FIG. 5, a lottery (second lottery) is implemented based on the win probability (acquisition probability) corresponding to the type of the selected item IT.

FIG. 6 illustrates an example of table information that is referred to when implementing the second lottery. Table information 300 illustrated in FIG. 6 includes a win probability 320 that corresponds to a type 310 of each item IT. According to the example illustrated in FIG. 6, the player can acquire the enemy character at a probability of 30% when the player uses the item "NORMAL", and can acquire the enemy character at a probability of 50% when the player uses the item "SILVER". The table information 300 also includes a price 330 and a price 340 that correspond to the type 310 of each item IT. The player can purchase the item IT using in-game money (or virtual money or cash currency) possessed by the player. As illustrated in FIG. 6, the win probability is set to each item IT so that the win probability increases as the price 330 and the price 340 increase. Note that the price 330 is the price of the item IT when purchasing the item IT before starting a battle with the enemy character (e.g., within the stage selection screen), and the price 340 is the price of the item IT when purchasing the item IT after starting a battle with the enemy character. The price 330 and the price 340 are set so that the price of the item IT before starting a battle with the enemy character is lower than the price of the item IT after starting a battle with the enemy character. The item "NORMAL" is an item that is given to the player free of charge, and the price 330 and the price 340 of the item "NORMAL" are set to "0 points".

Figure 7:
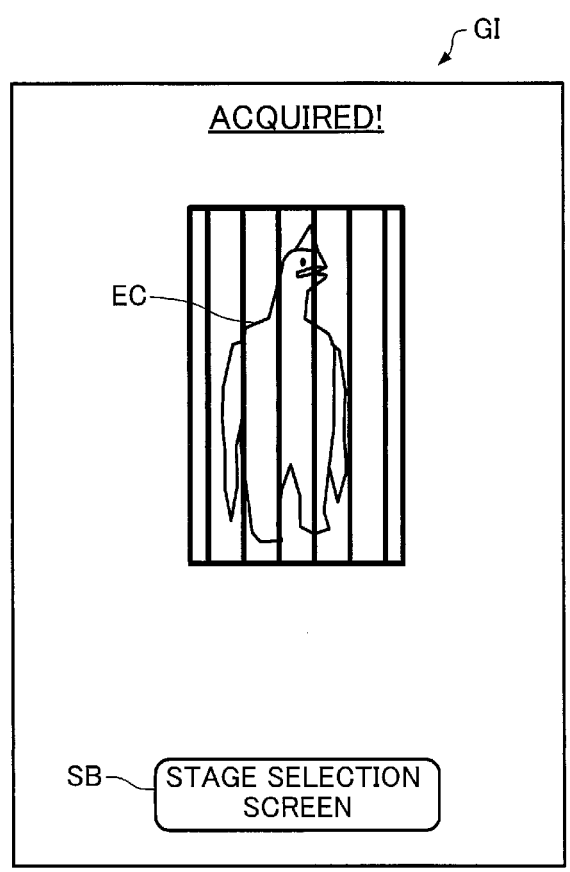
FIG. 7 illustrates an example of a game screen generated by a game system according to one embodiment of the invention.

When the player has won the second lottery, the game screen GI illustrated in FIG. 7 is displayed, and the enemy character EC defeated by the player is given to the player. An image that represents that the player has acquired the enemy character EC defeated by the player (i.e., an image that represents a state in which the enemy character EC defeated by the player is trapped in a cage) is displayed within the game screen GI illustrated in FIG. 7. The enemy character EC that has been given to the player is registered as a character possessed by the player, and the player can select the acquired enemy character EC as the player character PC. When the player has selected the button SB within the game screen GI illustrated in FIG. 7, the battle is terminated, and the stage selection screen is displayed.

Figure 8:
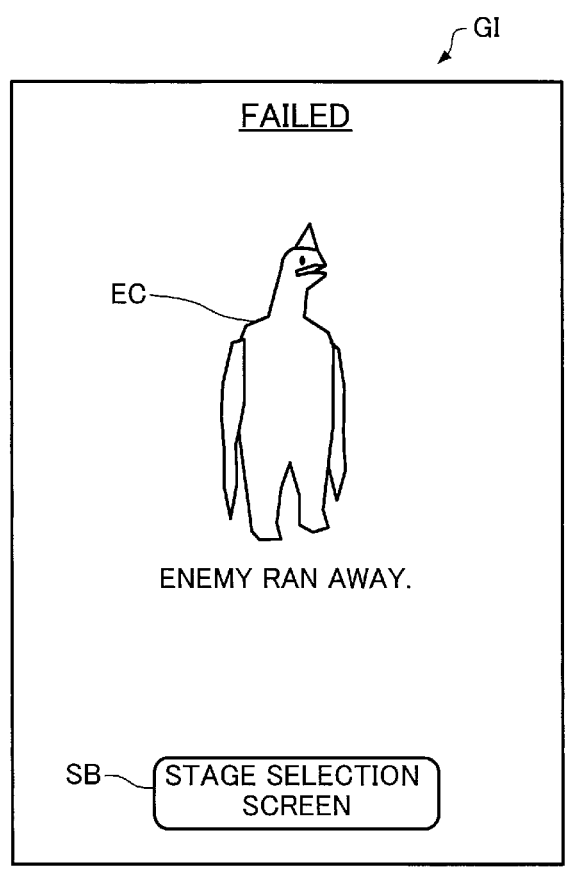
FIG. 8 illustrates an example of a game screen generated by a game system according to one embodiment of the invention.

When the player has lost the second lottery, the game screen GI illustrated in FIG. 8 is displayed. An image that represents that the player has failed to acquire the enemy character EC defeated by the player is displayed within the game screen GI illustrated in FIG. 8. When the player has selected the button SB within the game screen GI illustrated in FIG. 8, the battle is terminated, and the stage selection screen is displayed.

Figure 9:
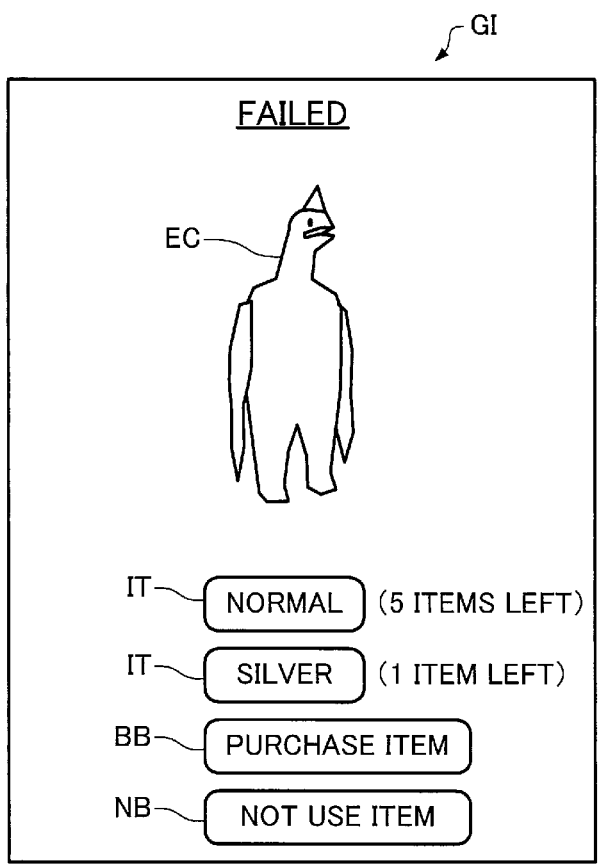
FIG. 9 illustrates an example of a game screen generated by a game system according to one embodiment of the invention.

Note that the game according to one embodiment of the invention may be designed so that the game screen GI illustrated in FIG. 9 is displayed when the player has lost the second lottery, and the player can take part in the second lottery again using the item IT (i.e., an opportunity to acquire the enemy character defeated by the player is given to the player again). A list of the items IT possessed by the player is displayed within the game screen GI illustrated in FIG. 9 in the same manner as in the game screen GI illustrated in FIG. 5 so that the player can sect the desired item IT. Note that the number of items "SILVER" is decremented by 1 in the example illustrated in FIG. 9 on the assumption that the player used (consumed) the item "SILVER" when the game screen GI illustrated in FIG. 5 was displayed.

When the player has lost the second lottery, whether to display the game screen GI illustrated in FIG. 8 or the game screen GI illustrated in FIG. 9 (i.e., whether or not to give an opportunity to acquire the enemy character defeated by the player to the player again) may be determined by a lottery (randomly), or may be determined based on the type, the attribute, or the like of the enemy character defeated by the player, or may be determined based on the type, the attribute, or the like of the item IT used.

When the player has selected the button NB that instructs that the player does not use the item IT (does not acquire the enemy character EC) within the game screen GI illustrated in FIG. 5 or 9, the battle is terminated, and the stage selection screen is displayed.

Figure 10:
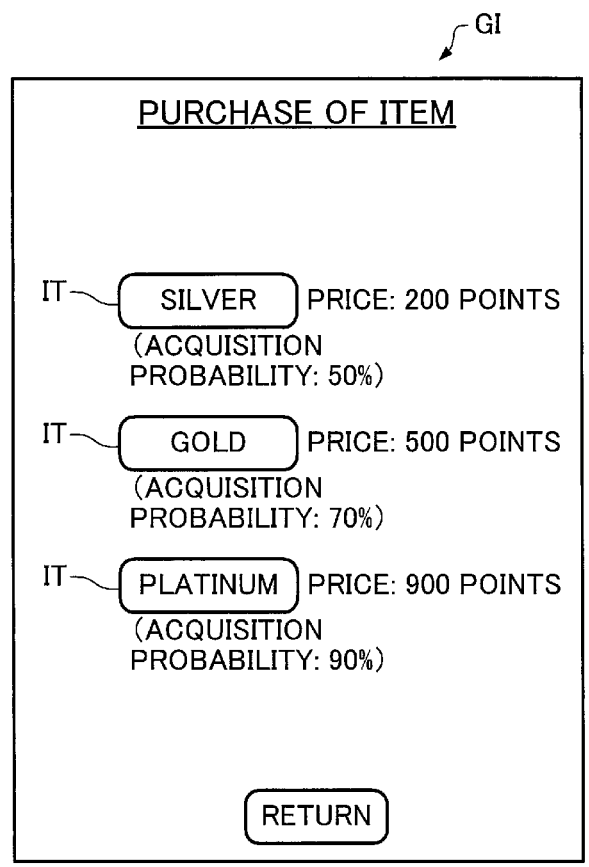
FIG. 10 illustrates an example of a game screen generated by a game system according to one embodiment of the invention.
Figure 11:
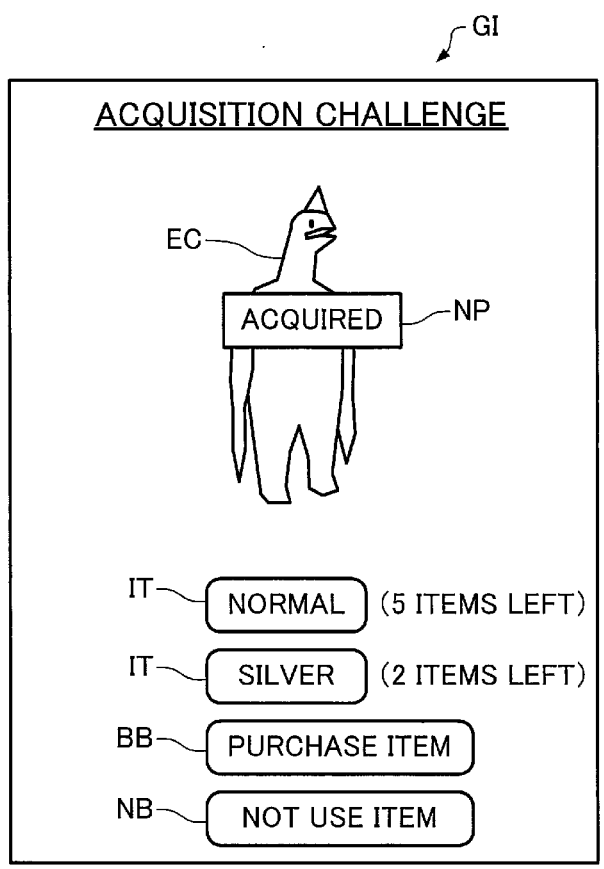
FIG. 11 illustrates an example of a game screen generated by a game system according to one embodiment of the invention.

When the player has selected the button BB that instructs that the player purchases the item IT within the game screen GI illustrated in FIG. 5 or 9, the game screen GI illustrated in FIG. 10 is displayed. A list of items IT that can be purchased (i.e., the type, the price, and the acquisition probability (win probability) of each item) is displayed within the game screen GI illustrated in FIG. 10. The list of the items IT illustrated in FIG. 10 is generated based on the table information 300 illustrated in FIG. 6. Since the game screen GI illustrated in FIG. 10 is displayed when the player purchases the item IT after starting a battle, the price of each item IT is the price specified by the price 340 included in the table information 300. The player can purchase the desired item IT by performing an operation input that selects the desired item IT within the game screen GI illustrated in FIG. 10. The item IT that has been purchased by the player is registered as an item possessed by the player, and the amount of in-game money possessed by the player is decremented by the price of the purchased item IT.

According to one embodiment of the invention, the player can obtain an opportunity to acquire the enemy character by performing an operation input that uses the item IT after starting a battle with the enemy character that the player desires to acquire, and increase the probability that the player will acquire the enemy character EC by selecting an item IT to which a high win probability is assigned. This makes it possible to allow the player to easily acquire the desired character.

When the player possesses a character that is identical with the enemy character with which the player character has battled, the player may be notified to that effect when the player uses (selects) the item IT. For example, a notification image NP illustrated in FIG. 11 that notifies the player that the enemy character EC with which the player character has battled has already been acquired by the player is displayed within the screen GI that allows the player to select the item IT so that the notification image NP is linked to the enemy character EC. Note that the game screen that notifies (warns) the player that the enemy character EC with which the player character has battled has already been acquired by the player may be displayed when the player has performed an operation input that selects the item IT within the screen (FIG. 5 or 9) that allows the player to select the item IT, and the second lottery may be implemented when the player has performed an operation input that instructs that the player uses the item IT within the game screen that notifies (warns) the player that the enemy character EC with which the player character has battled has already been acquired by the player. The notification image NP may be displayed within the screen (FIG. 3) that allows the player to battle with the enemy character EC so that the notification image NP is linked to the enemy character EC. This makes it possible to provide the player with information for determining whether or not to acquire the enemy character using the item, and improve convenience to the player. For example, it is possible to prevent a situation in which the player acquires the enemy character by consuming the item IT without knowing that the enemy character has already been acquired.

When giving the enemy character with which the player character has battled to the player, the attribute of the selected item IT may be set to be the attribute of the enemy character. For example, when an attribute "FIRE", "WATER", "LIGHT", or the like is set to each item IT, and the player has acquired the enemy character using the item IT with the attribute "FIRE", the attribute of the enemy character is set (changed) to "FIRE". In this case, the screen (FIG. 5 or 9) that allows the player to select the item IT, and the screen (FIG. 10) that allows the player to purchase the item IT may be configured so that the player can select the type and the attribute of the item IT. This makes it possible for the player to set the desired attribute to the enemy character to be acquired by the player, by selecting the item IT taking account of the attribute of the item IT.

The win probability that corresponds to the type of the selected item IT may be adjusted (corrected), and the second lottery may be implemented based on the adjusted win probability. More specifically, the win probability (acquisition probability) may be changed corresponding to the combination of the attribute of the selected item IT and the attribute of the enemy character with which the player character has battled. For example, when an attribute "FIRE", "WATER", "LIGHT", or the like is set to each item IT and the enemy character, the win probability may be increased when the attribute of the selected item IT is the same as the attribute of the enemy character with which the player character has battled, and may be decreased when the attribute of the selected item IT differs from the attribute of the enemy character with which the player character has battled. The win probability may be increased (or decreased) when the combination of the attribute of the selected item IT and the attribute of the enemy character with which the player character has battled is a specific combination. This makes it possible for the player to increase the probability that the player will acquire the enemy character by selecting the item IT taking account of the combination of the attribute of the item IT and the attribute of the enemy character that the player desires to acquire. This makes it possible to allow the player to easily acquire the desired character.

The win probability may be changed corresponding to the combination of the attribute of the player character PC and the attribute of the enemy character with which the player character has battled. For example, when an attribute "FIRE", "WATER", "LIGHT", or the like is set to each player character PC and the enemy character, the win probability may be increased when the attribute of the player character PC (e.g., the attribute of the player character PC that is set to be a leader, or the attribute of the player character PC that finally attacked the enemy character during the battle) is the same as the attribute of the enemy character with which the player character has battled, and may be decreased when the attribute of the player character PC differs from the attribute of the enemy character with which the player character has battled. The win probability may be increased (or decreased) when the combination of the attribute of the player character PC and the attribute of the enemy character with which the player character has battled is a specific combination. This makes it possible for the player to increase the probability that the player will acquire the enemy character by selecting the player characters PC that form a party (deck) taking account of the combination of the attribute of the player character PC and the attribute of the enemy character that the player desires to acquire. This makes it possible to allow the player to easily acquire the desired character.

The win probability that corresponds to the type of the selected item IT may be changed corresponding to the level or the rarity of the enemy character with which the player character has battled, the difference in level between the player character and the enemy character with which the player character has battled, the attribute of the player character, or the like. For example, the win probability may be increased as the level or the rarity (acquisition difficulty level) of the enemy character increases, or the difference in level between the player character and the enemy character with which the player character has battled increases.

When the player possesses a character that is identical with the enemy character that has been determined to be given to the player, a synthetic character generated by synthesizing the character possessed by the player that is identical with the enemy character that has been determined to be given to the player, and the enemy character that has been determined to be given to the player, may be given to the player. For example, when the player has succeeded in acquiring an enemy character A in a state in which the player possesses the enemy character A, a synthetic character A' generated by synthesizing these enemy characters A is given to the player (i.e., the enemy character A possessed by the player is replaced with the synthetic character A'). The synthetic character A' may be a character that differs from the enemy character A (i.e., a new character developed from the enemy character A), or may be a character that differs in parameter (e.g., level, rarity, or attack capability) from the enemy character A (i.e., a character generated by strengthening the enemy character A). This makes it possible to give a synthetic character generated by synthesizing the characters desired by the player to the player. Since the number of characters possessed by the player does not increase when an identical enemy character is additionally acquired, the above configuration is particularly effective when the number of characters that can be possessed by the player is limited.

The probability (appearance probability) that the enemy character with which the player character has battled will appear as a result of the first lottery may be increased when the player has lost the second lottery that may allow the player to acquire the enemy character with which the player character has battled. For example, when the player character has battled with the enemy character A in the stage "001", and the player has failed to acquire the enemy character A using the item IT, the appearance probability of the enemy character A in the stage "001" ("10%") and the stage "002" ("20%") is increased so that the enemy character A appears in the stage "001" and the stage "002" at a higher probability. According to this configuration, when the player has failed to acquire the desired enemy character, it is possible to cause the enemy character to appear at a higher probability. This makes it possible to allow the player to easily acquire the desired character. Note that the degree of increase in the appearance probability may be changed corresponding to the type of the item IT used by the player.

For example, the degree of increase in the appearance probability of the enemy character that the player has failed to acquire may be increased as the win probability (price) of the item IT used by the player increases.

3. Process

Figure 12:
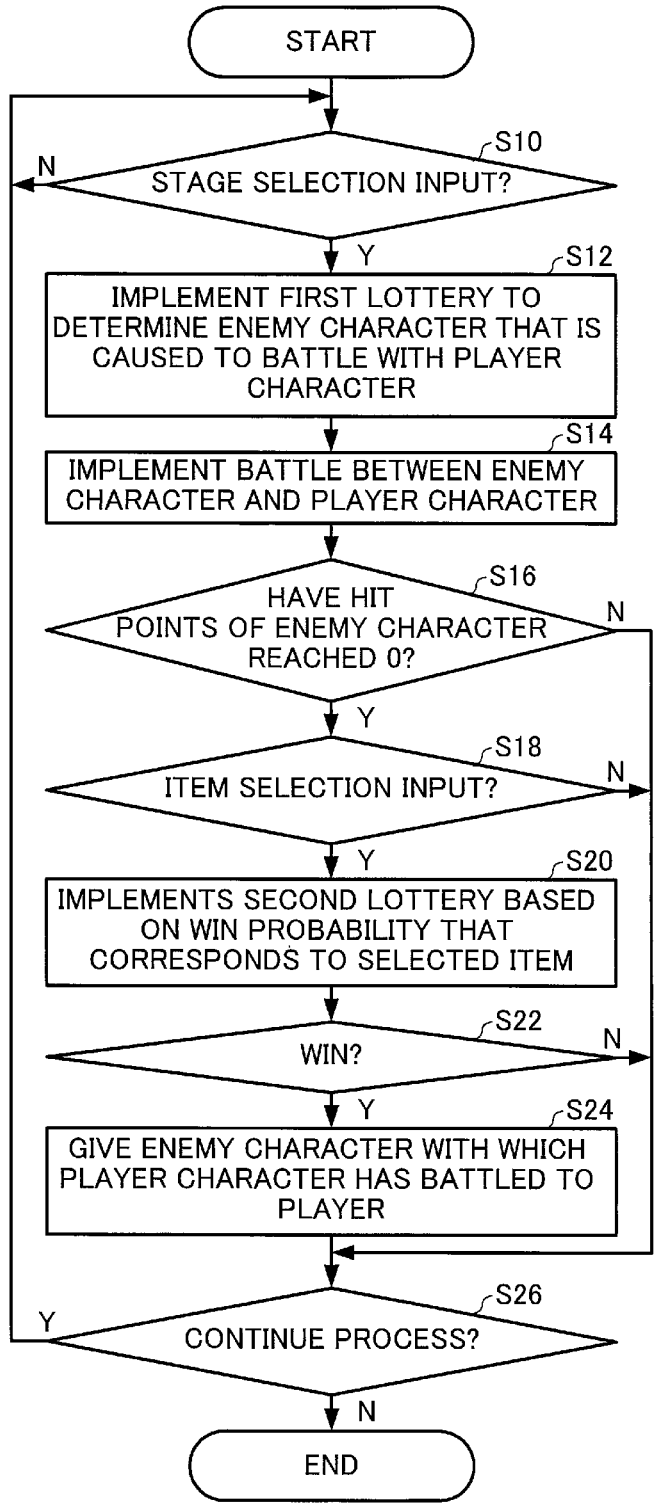
FIG. 12 is a flowchart illustrating the flow of a process according to one embodiment of the invention.

An example of the process performed by the game system according to one embodiment of the invention is described below with reference to FIG. 12 (flowchart).

The character appearance control section 110 determines whether or not the player has performed an operation input that selects the stage (step S10). When the character appearance control section 110 has determined that the player has performed an operation input that selects the stage (Y in step S10), the character appearance control section 110 refers to the table information 200, and implements the first lottery based on the appearance probability of each enemy character corresponding to the selected stage to determine the enemy character that is caused to battle with the player character (i.e., the enemy character that is caused to appear in the selected stage) (step S12).

The battle execution section 112 implements a battle between the enemy character and the player character based on an operation input and a given algorithm, and updates the hit points of the enemy character and the hit points of the player character (step S14).

The character-giving section 114 determines whether or not the hit points of the enemy character have reached "0" (i.e., whether or not the player has won the battle) (step S16). When the character-giving section 114 has determined that the hit points of the enemy character have reached "0" (Y in step S16), the character-giving section 114 determines whether or not the player has performed an operation input that selects the item IT (step S18). When the character-giving section 114 has determined that the player has performed an operation input that selects the item IT (Y in step S18), the character-giving section 114 refers to the table information 300, and implements the second lottery based on the win probability that corresponds to the selected item (step S20). The notification section 116 may determine whether or not the player possesses a character that is identical with the enemy character with which the player character has battled, immediately before or immediately after the step S18. When the notification section 116 has determined that the player possesses a character that is identical with the enemy character with which the player character has battled, the notification section 116 may notify the player to that effect. The character-giving section 114 may correct the win probability that corresponds to the selected item in the step S20 based on the attribute of the selected item IT, the attribute of the enemy character with which the player character has battled, the attribute of the player character, or a combination thereof, and implement the second lottery based on the corrected win probability.

The character-giving section 114 determines whether or not the player has won the second lottery (step S22). When the character-giving section 114 has determined that the player has won the second lottery (Y in step S22), the character-giving section 114 gives the enemy character with which the player character has battled (i.e., the enemy character determined in the step S12) to the player (step S24). Specifically, the character-giving section 114 registers the enemy character with which the player character has battled in the storage section 170 or the storage section (database) included in the server 20 as a character that is possessed by the player. When the hit points of the player character have reached "0" (i.e., when the player has lost the battle) (N in step S16), or when the player has performed an operation input that instructs that the player does not use the item IT (N in step S18), or when the player has lost the second lottery (N in step S22), the step S26 is performed.

The processing section 100 then determines whether or not to continue the process (step S26). When the processing section 100 has determined to continue the process, the step S10 is performed again.

4. Modifications

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

For example, the player may be allowed to acquire only some of the enemy characters that are caused to battle with the player character. For example, the player may be allowed to acquire only an enemy character with high rarity, and the appearance probability of the enemy character that can be acquired by the player may be set to be lower than the appearance probability of an enemy character (i.e., an enemy character with low rarity) that cannot be acquired by the player. The enemy character that can be acquired by the player may be caused to appear by a lottery based on the appearance probability corresponding to the number of items IT possessed by the player, and the appearance probability of the enemy character that can be acquired by the player may be increased as the number of items IT possessed by the player increases.

A charge item that increases the win probability of the item IT may be provided, and the win probability of the item IT may be increased by a specific amount each time the player has performed an operation that applies (synthesizes) the charge item to (with) the item IT. For example, the type of the item IT may be changed each time the charge item is applied to the free item IT so that the item "NORMAL" with a win probability of 30% changes to the item "SILVER" with a win probability of 50% when the charge item has been synthesized with the item "NORMAL", and the item "SILVER" changes to the item "GOLD" with a win probability of 70% when the charge item has been synthesized with the item "SILVER". An attribute may be set to the charge item, and the attribute of the charge item may be set to be the attribute of the item IT that is synthesized with the charge item.

When the player has performed an operation input that selects the item IT, the enemy character with which the player character has battled may be given to the player at a probability of 100%, or a win probability that is not linked to the type of the selected item IT (e.g., the win probability corresponding to the enemy character with which the player character has battled), and the rarity of the enemy character given to the player may be changed corresponding to the type of the selected item IT. For example, the rarity may be set corresponding to the type of item IT, and the rarity of the enemy character given to the player may be set to "NORMAL" when the item "NORMAL" has been selected, set to "RARE" when the item "SILVER" has been selected, and set to "SUPER RARE" when the item "GOLD" has been selected. This makes it possible for the player to acquire the enemy character by performing an operation input that uses the item IT after starting a battle with the enemy character that the player desires to acquire, and increase the rarity of the enemy character by selecting an item IT to which high rarity is assigned.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A non-transitory computer-readable information storage medium storing a program for implementing a battle game in which a player character battles with an enemy character, the program causing a computer to perform the functions of:
   causing the enemy character that is caused to battle with the player character to appear by implementing a first lottery;
   implementing a battle between the enemy character that has been caused to appear and the player character; and
   after the player character wins the battle between the player character and the enemy character:
     adjusting at least one game parameter of a second lottery, wherein the at least one game parameter includes a cost of items possessed by the player,
     monitoring for an operation input via an input device, from a player in the battle game being executed, that selects an item among the items possessed by the player after the player wins the battle against the enemy character,
     responsive to input of the selected item by the player in the battle game being executed,
       performing a process that implements the second lottery in the battle game being executed based on a win probability that corresponds to a type of the selected item,
       registering, in a storage section, the enemy character caused to appear by the first lottery and defeated in the battle as a character which is possessed and usable by the player responsive to the player having won the second lottery,
       responsive to the player having lost the second lottery, ending the battle,
     responsive to the player not selecting among the items, ending the battle,
   further comprising, after the player wins the second lottery, setting a value of an attribute of the enemy character which is defeated, to a value of an attribute of the selected item which is selected by the operation input after the enemy character is defeated, wherein the enemy character which is newly registered as possessed and usable by the player has the value changed by the selected item.

2. The non-transitory computer-readable information storage medium as defined in claim 1, wherein the program causes the computer to further perform the function of:
   when the player possesses a character that is identical with the enemy character with which the player character has battled, performing a process that notifies the player of the possession of the character.

3. The non-transitory computer-readable information storage medium as defined in claim 1, further comprising, after the selected item is selected by the input operation after the enemy character is defeated, adjusting the win probability that corresponds to the type of the selected item, on which the second lottery is based, based on a combination of an attribute of the selected item and an attribute of the enemy character with which the player character battled.

4. The non-transitory computer-readable information storage medium as defined in claim 1, further comprising, after the selected item is selected by the input operation after the enemy character is defeated, adjusting the win probability that corresponds to the type of the selected item, on which the second lottery is based, based on a combination of an attribute of the player character and an attribute of the enemy character with which the player character battled.

5. The non-transitory computer-readable information storage medium as defined in claim 1, further comprising increasing a probability that the enemy character with which the player character has battled will appear as a result of the first lottery when the player has lost the second lottery.

6. A non-transitory computer-readable information storage medium storing a program for implementing a battle game in which a player character battles with an enemy character, the program causing a computer to perform the functions of:

causing the enemy character that is caused to battle with the player character to appear by implementing a lottery;
  implementing a battle between the enemy character that has been caused to appear and the player character; and
  after the player character wins the battle between the player character and the enemy character:
    monitoring for an operation input via an input device, from a player in the battle game being executed, that selects an item among the items possessed by the player after the player character wins the battle against the enemy character,
    responsive to input of the selected item by the player in the battle game being executed,
      increasing or decreasing a rarity of the defeated enemy character to correspond to a rarity of a type of the selected item selected by the player, wherein the item which is selected by the player determines whether the rarity of the defeated enemy character is increased or decreased responsive to the player character winning the battle, and then
      registering, in a storage section, the enemy character that is defeated and whose rarity is increased or decreased as determined by the rarity of the type of the selected item selected by the player, as a character which is possessed by the player to possess and use, wherein the enemy character which is newly registered as possessed and usable by the player has the rarity changed to correspond to the rarity of the type of the selected item.

7. The non-transitory computer-readable information storage medium as defined in claim 6, wherein the program causes the computer to further perform the function of:

when the player possesses a character that is identical with the enemy character with which the player character has battled, performing a process that notifies the player of the possession of the character.

8. A game system that implements a battle game in which a player character battles with an enemy character, the game system comprising:

a processor and a memory, the processor is configured execute a program stored in the memory to
  cause the enemy character that is caused to battle with the player character to appear by implementing a first lottery;
  implement a battle between the enemy character that has been caused to appear and the player character; and
  after the player character wins the battle between the player character and the enemy character:
    adjust at least one game parameter of a second lottery, wherein the at least one game parameter includes a cost of items possessed by the player,
    monitor for an operation input via an input device, from a player in the battle game being executed, that selects an item among the items possessed by the player after the player wins the battle against the enemy character,
    responsive to input of the selected item by the player in the battle game being executed,
      perform a process that implements the second lottery in the battle game being executed based on a win probability that corresponds to a type of the selected item,
      register, in a storage section, the enemy character caused to appear by the first lottery and defeated in the battle as a character which is possessed by the player responsive to the player having won the second lottery,
      responsive to the player having lost the second lottery, end the battle, and
    responsive to the player not selecting among the items, end the battle,
  wherein the processor is further configured to, after the player wins the second lottery, set a value of an attribute of the enemy character which is defeated, to a value of an attribute of the selected item which is selected by the operation input after the enemy character is defeated, wherein the enemy character which is newly registered as possessed and usable by the player has the value changed by the selected item.

9. The game system as defined in claim 8, wherein the program causes the computer to further perform the function of:

when the player possesses a character that is identical with the enemy character with which the player character has battled, performing a process that notifies the player of the possession of the character.

10. The game system as defined in claim 8, wherein the processor is further configured to, after the selected item is selected by the input operation after the enemy character is defeated, adjust the win probability that corresponds to the type of the selected item, on which the second lottery is based, based on a combination of an attribute of the selected item and an attribute of the enemy character with which the player character battled.

11. The game system as defined in claim 8, wherein the processor is further configured to, after the selected item is selected by the input operation after the enemy character is defeated, adjust the win probability that corresponds to the type of the selected item, on which the second lottery is based, based on a combination of an attribute of the player character and an attribute of the enemy character with which the player character battled.

12. The game system as defined in claim 8, wherein the processor is further configured to increase a probability that the enemy character with which the player character has battled will appear as a result of the first lottery when the player has lost the second lottery.

* * * * *